(12) United States Patent
Bratel et al.

(10) Patent No.: US 6,443,286 B1
(45) Date of Patent: Sep. 3, 2002

(54) MODULATABLE POWER TRANSMISSION CLUTCH AND A MARINE TRANSMISSION

(75) Inventors: Dean J. Bratel, New Berlin; Paul A. Pelligrino, Muskego, both of WI (US)

(73) Assignee: Twin Disc, Incorporated, Racine, WI (US)

( * ) Notice: Subject to any disclaimer, the term of this patent is extended or adjusted under 35 U.S.C. 154(b) by 50 days.

(21) Appl. No.: 09/765,117

(22) Filed: Jan. 18, 2001

(51) Int. Cl.$^7$ .............................................. F16D 25/06
(52) U.S. Cl. .................... 192/85 AA; 192/51; 192/52.4; 440/75
(58) Field of Search ................. 192/51, 52.4, 109 F, 192/21, 85 AA; 440/75

(56) References Cited

U.S. PATENT DOCUMENTS

| | | | | |
|---|---|---|---|---|
| 4,070,926 A | * | 1/1978 | Schneider et al. | 192/109 F X |
| 4,186,829 A | | 2/1980 | Schneider et al. | 192/109 F |
| 4,451,238 A | | 5/1984 | Arnold | 440/75 |
| 4,459,873 A | | 7/1984 | Black | 74/720 |
| 4,836,809 A | | 6/1989 | Pelligrino | 440/2 |
| 5,511,644 A | * | 4/1996 | Murata | 192/85 AA |
| 5,950,787 A | * | 9/1999 | Murasugi et al. | 195/85 AA |
| 6,035,989 A | * | 3/2000 | Matsuoka | 192/85 AA |

* cited by examiner

Primary Examiner—Saul Rodriguez
(74) Attorney, Agent, or Firm—Nilles & Nilles SC

(57) ABSTRACT

A modulatable power transmission clutch including interleaved clutch plates and having a central power transmitting shaft extending axially through the clutch. The clutch includes a fluid operated movable piston for effecting clutch operation by compression of the plates. The piston has a smaller piston area and a larger piston area, the smaller piston area has fluid flow directed to it a variable fluid pressure whereby the clutch is modulatable. The larger piston area is adapted to have fluid flow directed thereto to effect maximum and unmodulatable engagement of the clutch. A spring loaded normally closed trigger valve controls fluid flow to the larger piston area in response to fluid pressure above a predetermined amount at the smaller piston area. The trigger valve is mounted in the shaft and is normally closed so that pressure fluid is directed to the smaller piston area at a variable fluid pressure whereby the clutch is modulatable. When the valve is open by said fluid pressure over a predetermined amount, the valve permits fluid flow to the larger piston area to effect maximum and unmodulatable engagement of the clutch for full clutch capacity.

7 Claims, 5 Drawing Sheets

MODULATABLE POWER TRANSMISSION CLUTCH AND A MARINE TRANSMISSION

BACKGROUND OF THE INVENTION

1. Field of Use

This invention relates generally to modulatable power transmission clutches and, in particular, to those wherein a fluid-applied spring release piston operates on clutch plates which are disposed between a rotatable driving member and a rotatable driven member to effect clutch modulation.

2. Description of the Prior Art

Each of the following U.S. patents has been assigned to an assignee common with the present application.

U.S. Pat. No. 4,451,238, issued May 29, 1984 to Arnold, discloses a multi-clutch transmission with forward and reverse shafts and gear trains between these shafts, and discusses the damaging shocks to the propulsion system which sometimes occur during maneuvering operations.

U.S. Pat. No. 4,459,873, issued Jul. 17, 1984 to Black, shows a marine propulsion system and discusses a brake which is engaged to anchor a portion of the planetary gear system to drive the propeller in a forward direction, and the brake is disengaged when the torque converter is driving the propeller shaft in the reverse direction. This patent discusses prior art transmissions, which were not always satisfactory because of flutter failure of the forward drive clutch, when it was required to operate in the reverse direction for reversing the direction of the boat.

U.S. Pat. No. 4,836,809, issued Jun. 6, 1989 to Pelligrino, discloses a marine vessel propulsion system having forward and reverse clutches in which each clutch can be fully engaged, fully disengaged, and modulated.

U.S. Pat. No. 4,186,829, issued Feb. 5, 1980 to Schneider and Pelligrino, discloses a modulatable power transmission clutch. This patent discloses a spring biased trigger valve, which is located radially outwardly of the central power transmission shaft on which the clutch is mounted.

SUMMARY OF THE PRESENT INVENTION

The present invention provides a modulatable power transmission clutch and also a marine transmission system for variable speed control having dual area clutch pistons. Clutch capacity is varied by separate fluid areas of the clutch, one area being smaller than the other. The marine transmission clutch is modulated by means of the small area of the piston utilizing a selectively operable control resulting in variable propeller speed. Pressure fluid is supplied to the small area by controlling a proportional valve. Modulation of the clutch offers enhanced docking control and vessel positioning. At a predetermined pressure level at the source area of the piston, a spring biased trigger valve allows the flow of pressure fluid to the large area of the piston whereby the clutch can reach full clutch capacity. The system offers seamless transition from modulating operation of the clutch where engine speed can be increased slightly to full engagement of the clutch.

The dual area clutch provided by the present invention provides smooth transition from the initial docking mode and provides for precise and rapid back and forth changes in speed for maneuvering in the docking procedure. The valve of the present invention is located in the central power transmission shaft that extends through the clutch, is much less complicated than the valves of the prior art, and is not affected by centrifugal pressure.

These and other objects and advantages of the invention will appear as this disclosure progresses.

DESCRIPTION OF THE PREFERRED EMBODIMENT

Figure 1:
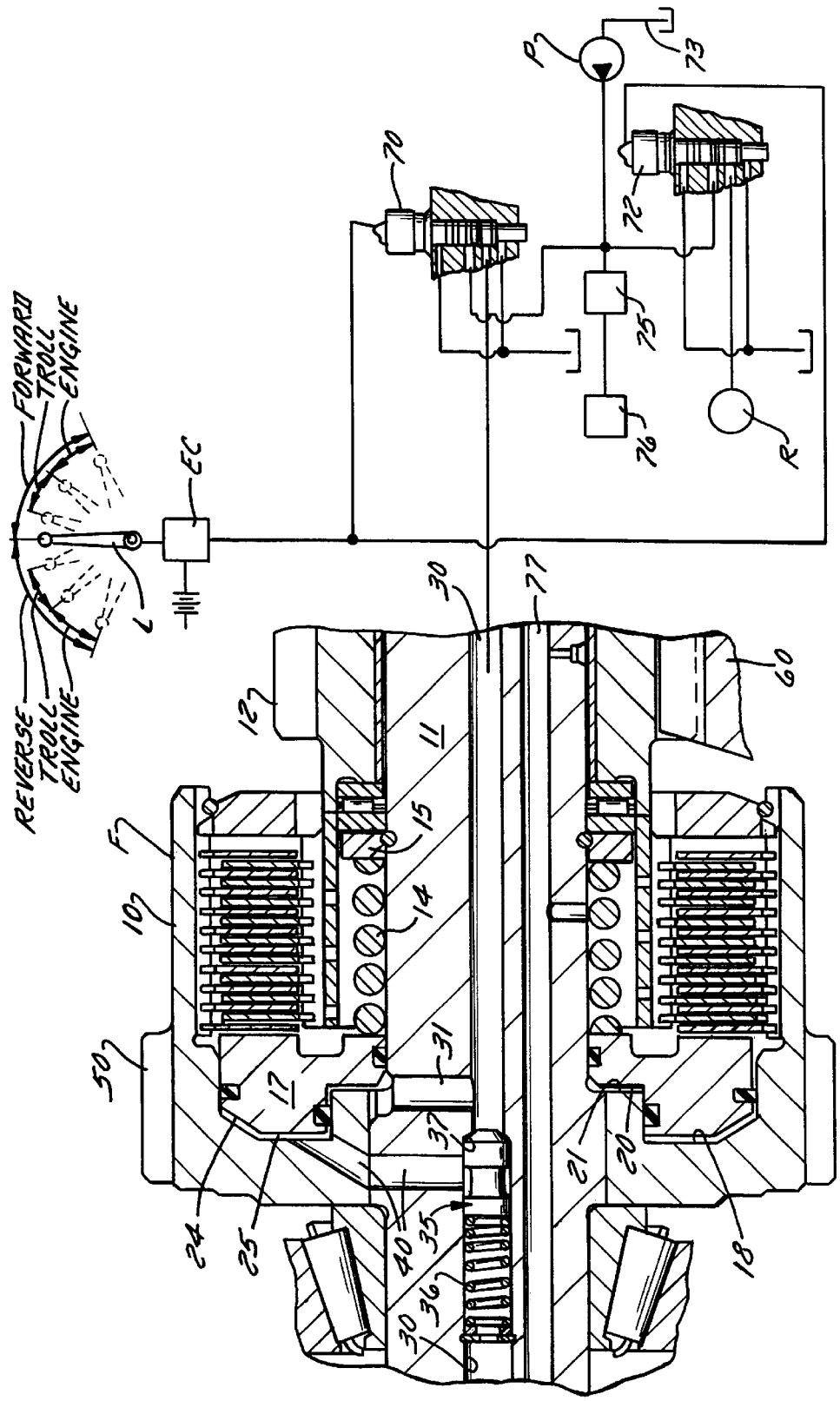
FIG. 1 is a longitudinal cross-sectional view through a clutch made in accordance with the present invention and also includes a schematic diagram of the control system therefor.

As shown in FIG. 1, the present invention relates to a forward clutch F of the type having interleaved friction plates some of which are splined respectively to a hollow cylinder housing 10 that is fixed to a power input shaft 11 on which it is mounted for rotation therewith and driven by engine E (FIG. 2) through input coupling G splined to shaft 11. The other interleaved plates are splined to the output gear 12 as is conventional. A spring 14 mounted around shaft 11 and at one end bears against an axially fixed snap ring 15. The other end of the spring acts against the clutch piston 17 that is slidable in the chamber 18, to urge the piston to a clutch disengaged position.

It will be noted that the annular piston 17 has a smaller area 20, which defines with the housing 10 and small clutch actuating chamber 21. The piston 17 also has a larger area 24, which with the housing defines a large clutch actuating chamber 25.

A fluid passage 30 is rifle drilled in shaft 11 for conducting pressure fluid from a proportional valve 70, and through a cross port 31 to the small piston area 20.

Figure 4:
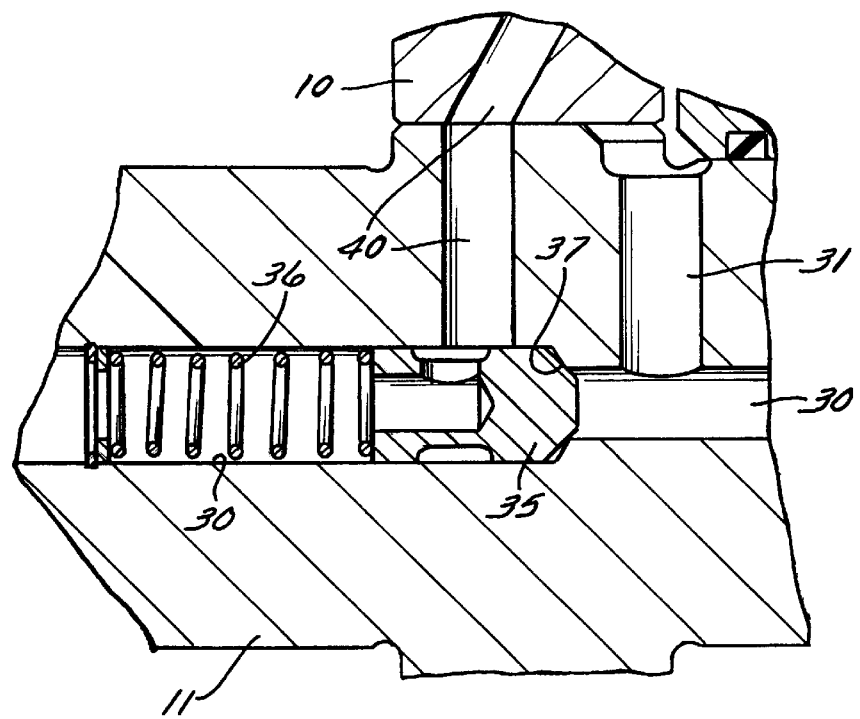
FIGS. 4 and 5 are enlarged fragmentary views of the trigger valve shown in FIGS. 1 and 2 and shown, respectively, in the closed and open position.
Figure 5:
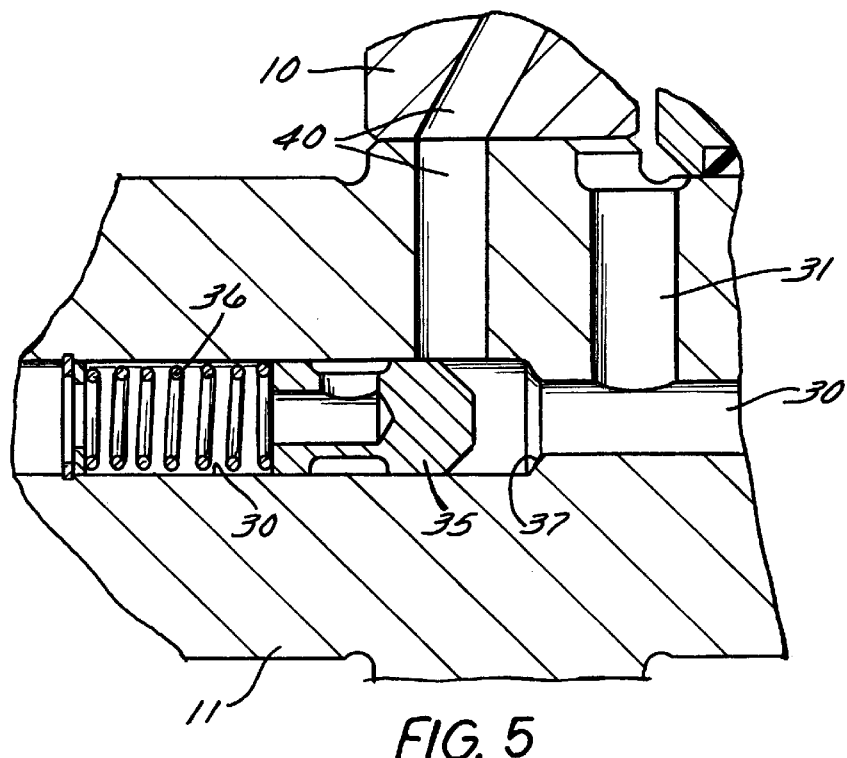

A spring loaded trigger valve 35, shown on an enlarged scale in FIGS. 4 and 5, is located in passage 30 and the head 35 of the valve acts under the action of the spring 36 and against valve seat 37 formed in the passage 30. Fluid passage 40 places fluid passage 30 in communication with the large area of the chamber 25 when pressure fluid in passage 30 is great enough to compress spring 36.

Figure 2:
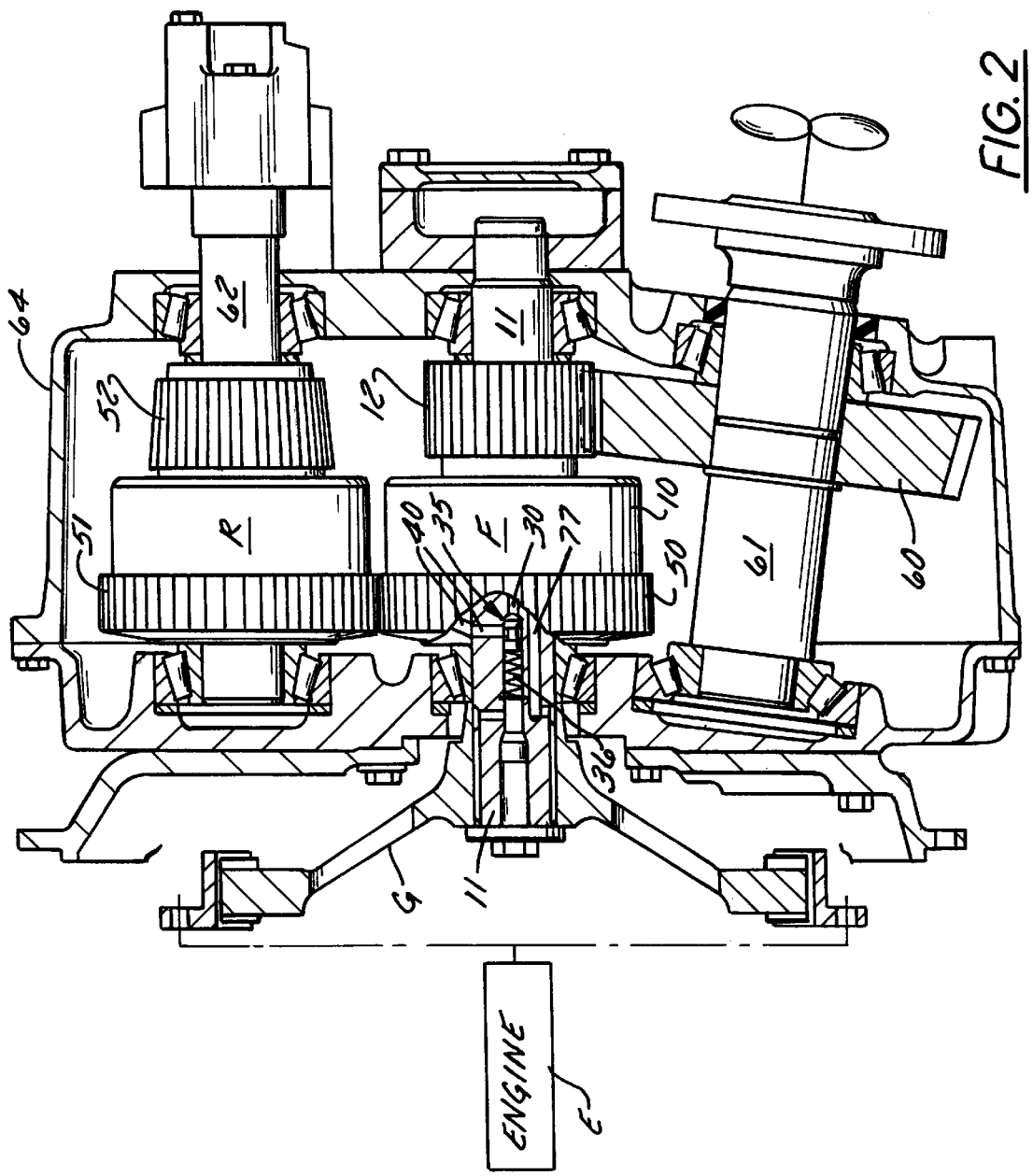
FIG. 2 is a longitudinal cross-sectional view through a transmission of the present invention and includes a showing of both the forward and reverse clutches, the rear clutch being rotated around the input shaft from its normal position and into a plane with the forward clutch for clarity in the drawings.

As shown in FIG. 2, the forward clutch F and reverse clutch R are in constant mesh with one another through their annular external gears 50 and 51 formed around their housing. Gear 60 is fixed to the propeller shaft 61, which is suitably journaled in the gear transmission case 64. Shaft 62 of the reverse clutch R, shaft 11 of the forward shaft and the propeller shaft 61 are all suitably journaled in the gear casing 64 on conventional antifriction tapered roller bearings as shown. The forward clutch F shown and described in FIG. 1 is the same as the reverse clutch R and further description of the reverse clutch is deemed to be neither necessary nor desirable.

Figure 3:
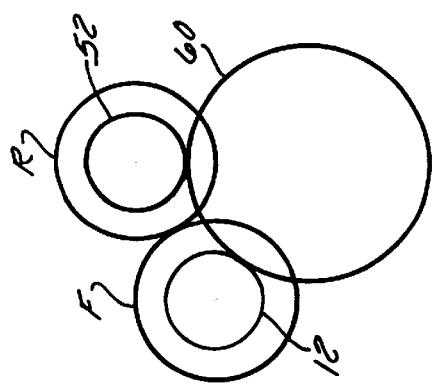
FIG. 3 is a transverse, cross-sectional, schematic view on a reduced scale showing the usual relative positions of the two clutches and the output shaft as shown in FIG. 2.

As shown in schematic FIG. 3, the gears 12, 52 and 60 are in constant mesh. The reverse clutch R is used to reverse output direction.

Figure 6:
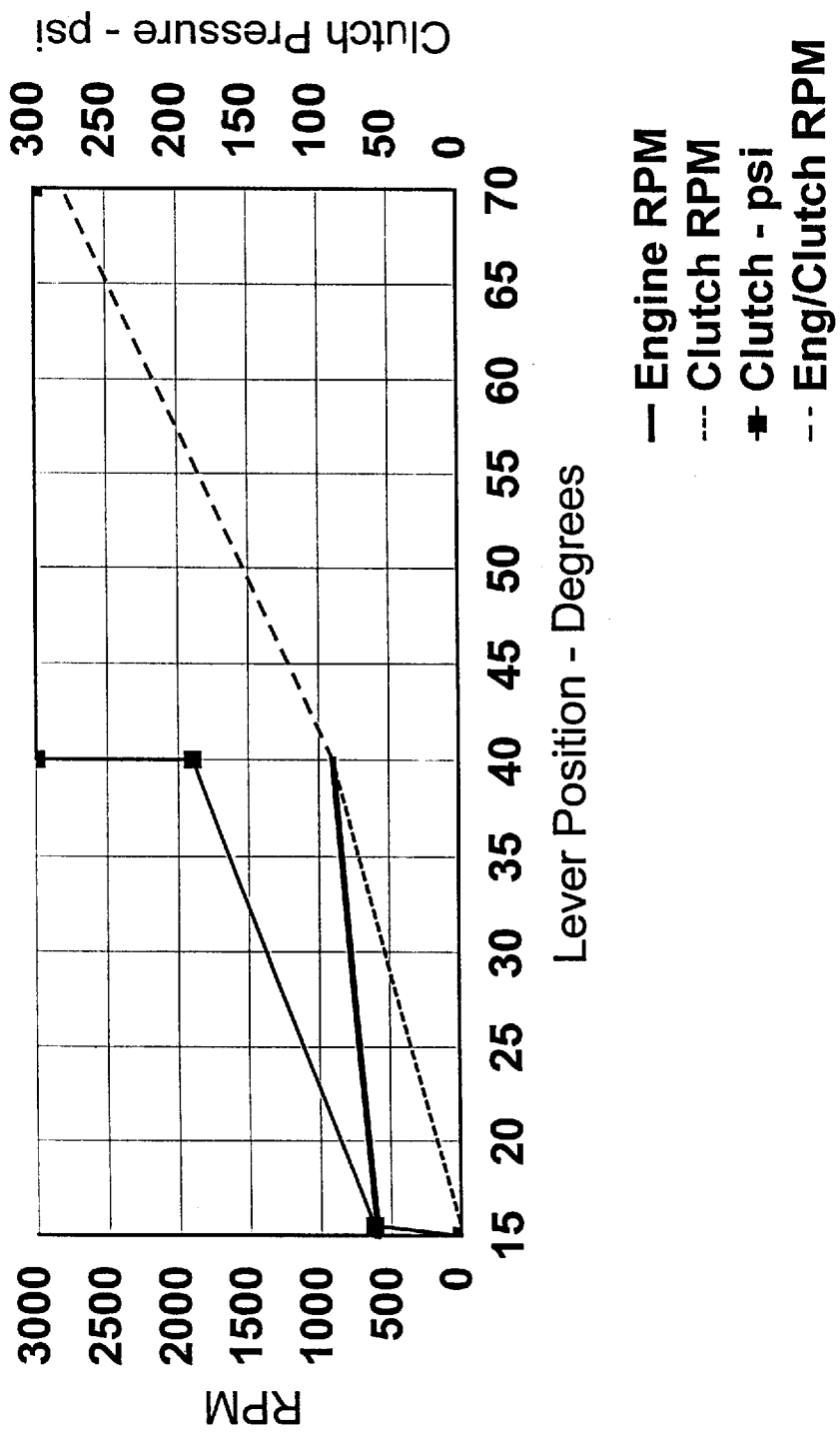
FIG. 6 is a graph showing the characteristics of the clutch wherein the position of the control lever in degrees is plotted against the engine rpm, the clutch rpm, and the engine/clutch rpm.
Figure 7:
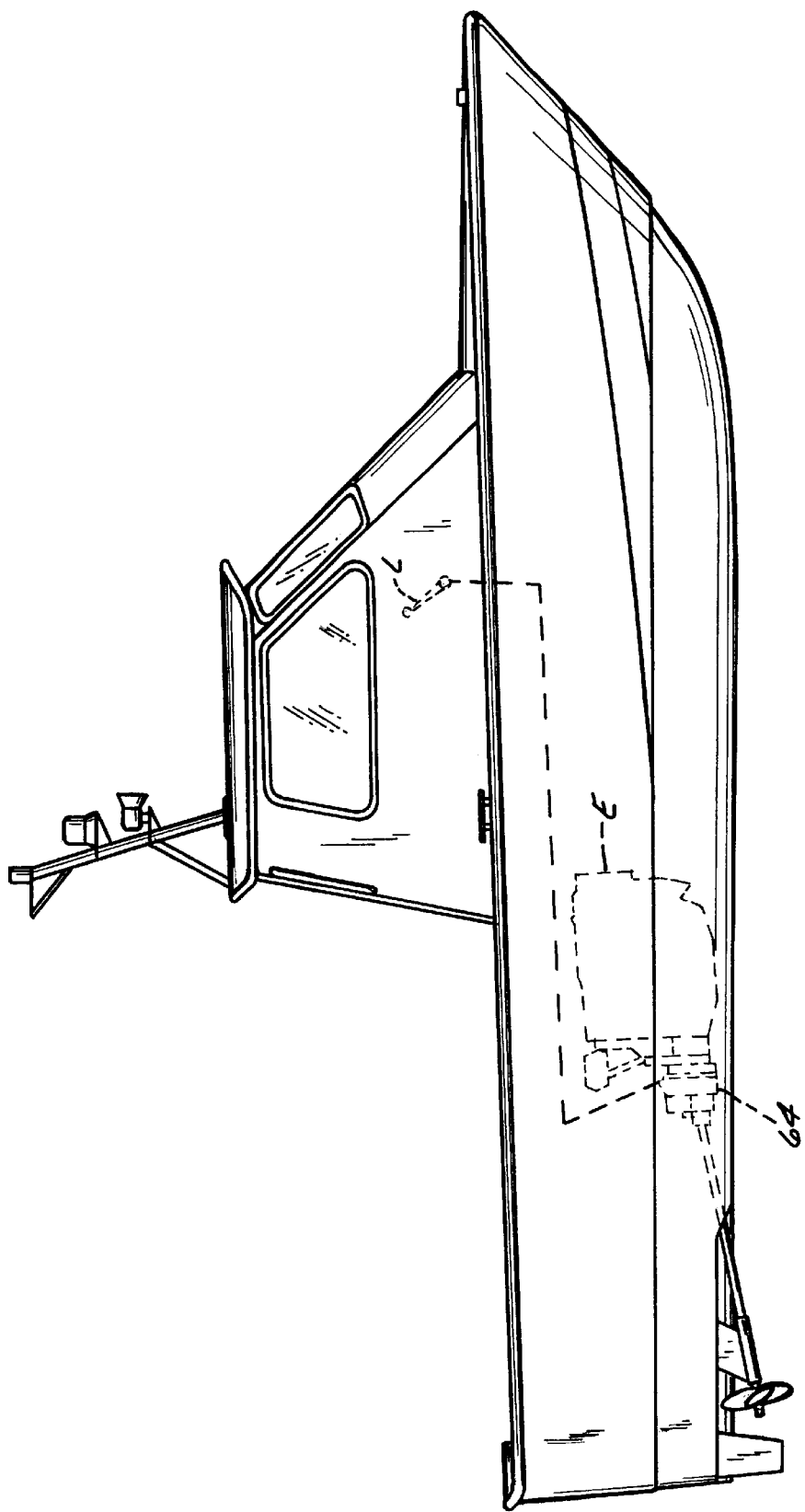
FIG. 7 is a side elevational view of a marine craft utilizing the present invention.

Referring to the schematic diagram in the control system in FIG. 1, a control lever L is utilized, through an electronic controller EC, to select operation of the either the forward or the reverse clutch. When the lever L is moved to the right, it causes actuation of the forward clutch. Conversely, when the lever L is moved to the left, it causes actuation of the reverse clutch. It will be noted that the lever has a troll position in either forward or reverse. When the lever is moved from neutral to the troll position, the clutch operates in a troll mode. Then further movement of the lever acts to cause increase in engine speed. As shown in FIG. 6, when the lever reaches the 40° mark, continued movement of the lever increases the engine/clutch rpm as shown. It also increases the clutch pressure as shown on the right-hand side of the graph. The proportional valve 70 is provided for the forward clutch F and a proportional valve 72 is provided for the reverse clutch R. Proportional valves 70 and 72 are similar and operate to draw pressure fluid from the source 73 and direct it to either clutch F or clutch R, respectively. Pressure fluid is also directed to a main regulator 75 (FIG. 1) and lubrication passage 76 for lubricating the drive plates and bearings of the clutches via the rifle drilling 77 in the shaft and in the known manner.

Generally, the electronic control (EC) is microprocessor-based and sends a pulse width modulated (PWM) signal to control the proportional valves 70 and 72 for each clutch. The level of the PWM signal sent to the valves is directly related to the position of lever L. By utilizing the small area 20 of the clutch, a wide pressure differential is realized to modulate the clutch. Thus, the electronic control (EC) is programmable to allow the engine speed to match the propeller horsepower selected for clutch synchronization.

Recapitulation

The present invention provides for a marine transmission system for variable speed control comprising an electronic control system and dual area clutch pistons. Clutch capacity is varied by separate fluid areas to the clutch, one area being smaller than the other. The marine transmission clutch is modulated via the small area of the piston utilizing a selectively operable control allowing variable propeller speed. Fluid is supplied to the small area by controlling a proportional valve via the control. Modulation offers enhanced docking control and vessel positioning. At a predetermined level, a spring biased trigger valve controls the fluid to the large area of the piston to reach full clutch capacity.

The initial actuation or modulation of the clutch is utilized, for example, for marine boats for docking and vessel positioning. The fluid pump P (FIG. 1) which supplies fluid to the proportional valves 70 or 72 provides fluid pressure. The lever L in the quadrant shown in FIG. 1, which is movable from a neutral position to a detent position and then to forward position, actuates the valves. Similarly, the quadrant can be swung in the opposite direction for reverse of the transmission when fluid is directed to the other proportional valve 72 for reverse operation of the transmission. In either direction, pressure fluid is first admitted to the small area 20 behind the piston 17 and after it reaches a certain pressure, the piston is urged to open against the pressure of its spring 14 and permit pressure fluid to flow to the large area behind the piston. The arrangement provides for a variable speed control and clutch capacity is varied by separate fluid areas of the clutch, one area being smaller than the other area. The transmission clutches are modulated via the small area of the piston utilizing a selectively operable control allowing variable output speed.

Modulation of the clutch offers docking control and vessel positioning. Then at a predetermined pressure level, the spring biased trigger valve controls the flow of fluid to the large area of the piston to thereby cause it to reach full clutch capacity. This system provides seamless transition from modulation to full engagement. During modulation, engine speed can be increased slightly. After modulation the engine throttle is controlled.

By locating the trigger valve in the center shaft of the clutch, it is not influenced by centrifugal speed of the clutch. Furthermore, the present trigger valve in its operation is much simpler than the prior art triggering valve. This provides for immediate response during modulation and the engine speed can be increased slightly and accurately in either direction to provide precise and rapid back and forth changes in speed for maneuvering, for example, of the boat during the docking procedure.

What is claimed is:

1. A modulatable power transmission clutch including interleaved clutch plates, said clutch having a central power transmitting shaft extending axially through said clutch mounted thereon, said clutch including a fluid operated movable piston for effecting clutch operation by compression of said plates, said piston having smaller and larger piston areas thereon, the smaller piston area being adapted to have fluid flow directed thereto at a variable fluid pressure whereby said clutch is modulatable, the larger piston area being adapted to have fluid flow directed thereto to effect maximum and unmodulatable engagement of said clutch;

and a spring loaded normally closed valve for controlling fluid flow to said larger piston area in response to fluid pressure above a predetermined amount at said smaller piston area, said valve being mounted in said shaft and being normally closed whereby pressure fluid is directed to said smaller piston area at a variable fluid pressure whereby said clutch is modulatable, and when said valve is open by said fluid pressure over a predetermined amount permits fluid flow to said larger piston area to effect maximum and unmodulatable engagement of said clutch for full clutch capacity.

2. A modulatable power transmission clutch including interleaved clutch plates, said clutch comprising a power transmitting shaft extending axially and centrally through said clutch mounted thereon, said clutch including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable, the other larger of said piston areas being adapted to have fluid flow directed thereto to effect maximum and unmodulatable engagement of said clutch;

and valve means for controlling fluid flow to said other larger of said piston areas in response to fluid pressure at said one smaller of said piston areas, said valve means being axially slidably mounted in an axially extending hole in said shaft and spring loaded to a normally closed position in which pressure fluid is directed to said one smaller piston area at a variable fluid pressure whereby said clutch is modulatable, and when said valve means is open it permits fluid flow to said other larger of said piston area to effect maximum and unmodulatable engagement of said clutch for full clutch capacity.

3. A modulatable power transmission clutch including interleaved clutch plates, said clutch comprising a power transmitting shaft extending axially and centrally through said clutch mounted thereon, said clutch including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable, the other larger of said piston areas being adapted to have fluid flow directed thereto to effect maximum and unmodulatable engagement of said clutch;

and a trigger valve for controlling fluid flow to said other larger of said piston areas in response to fluid pressure above a certain valve at said one smaller of said piston areas, a pressure fluid passage in said shaft for conducting pressure fluid to said smaller area and to said larger piston area, said trigger valve being located in said shaft passage and being spring loaded to a normally closed position in which pressure fluid is directed to said one smaller piston area at a variable fluid pressure whereby said clutch is modulatable, said trigger valve when closed acting to block flow of fluid to said larger area below a predetermined pressure and when open acting to permit fluid flow above a predetermined pressure to said larger area of said piston to effect maximum and unmodulatable engagement of said clutch for full clutch capacity.

4. A marine transmission for variable speed control of a boat having a propeller for providing modulatable lower speed in both forward and reverse direction for maneuvering during docking of said boat to provide enhanced docking control and boat positioning;

said transmission providing seamless transition from modulation during which speed can be increased slightly to full clutch engagement and capacity for driving said propeller;

said transmission including a modulatable power transmission clutch including interleaved clutch plates, said clutch comprising a power transmitting shaft extending axially and centrally through said clutch mounted thereon, said clutch including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable for said docking, the other larger of said piston areas being adapted to have fluid flow directed thereto to effect maximum and unmodulatable engagement of said clutch for driving said propeller;

and valve means for controlling fluid flow to said other larger of said piston areas in response to fluid pressure at said one smaller of said piston areas, said valve means being axially slidably mounted in an axially extending hole in said shaft and spring loaded to a normally closed position in which pressure fluid is directed to said one smaller piston area at a variable fluid pressure whereby said clutch is modulatable, and when said valve means is open it permits fluid flow to said other larger of said piston area to effect maximum and unmodulatable engagement of said clutch for full clutch capacity available to said propeller.

5. A power transmission including a forward modulatable power transmission clutch and a rear modulatable power transmission clutch, said forward clutch connected in power receiving connection with a prime mover and in power delivering connection with load to be driven, said rear clutch being connected in driven engagement with said forward clutch and engageable with said load to be driven for driving the latter in a reverse direction, said forward and rear clutches each including clutch plates, a power transmitting shaft extending axially and centrally therethrough, said clutch including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable, the other larger of said piston areas being adapted to have fluid flow directed thereto to effect maximum and unmodulatable engagement of said clutch;

and valve means for controlling fluid flow to said other larger of said piston areas in response to fluid pressure above a predetermined amount at said one smaller of said piston areas, said valve means being axially slidably mounted in an axially extending hole in said shaft and spring loaded to a normally closed position in which pressure fluid is directed to said one smaller piston area at a variable fluid pressure whereby said clutch is modulatable, and when said valve means is open it permits fluid flow to said other larger of said piston area to effect maximum and unmodulatable engagement of said clutch for full clutch capacity.

6. A power transmission including a forward modulatable power transmission clutch and a rear modulatable power transmission clutch, said forward clutch connected in power receiving connection with a prime mover and in power delivering connection with load to be driven, said rear clutch being connected in driven engagement with said forward clutch and engageable with said load to be driven for driving the latter in a reverse direction, said forward and rear clutches each including clutch plates, a power transmitting shaft extending axially and centrally therethrough, each of said clutches including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable, the other larger of said piston areas being adapted to have fluid flow directed thereto to effect maximum and unmodulatable engagement of said clutch;

and for each of said forward and rear clutches, a trigger valve for controlling fluid flow to said other larger of said piston areas in response to fluid pressure above a certain valve at said one smaller of said piston areas, a pressure fluid passage in said shaft for conducting pressure fluid to said smaller area and to said larger piston area, said trigger valve being located in said shaft passage and being spring loaded to a normally closed position in which pressure fluid is directed to said one smaller piston area at a variable fluid pressure whereby said clutch is modulatable, said trigger valve when closed acting to block flow of fluid to said larger area below a predetermined pressure, and when said trigger valve is open acting to permit fluid flow above a predetermined pressure to said larger area of said piston to effect maximum and unmodulatable engagement of said clutch for full clutch capacity.

7. A marine transmission for variable speed control of a boat having a propeller for providing modulatable lower speed in both forward and reverse direction for maneuvering during docking of said boat to provide enhanced docking control and boat positioning;

said transmission providing seamless transition from modulation during which speed can be increased slightly to full clutch engagement and capacity for driving said propeller;

said transmission including a forward modulatable power transmission clutch and a rear modulatable power transmission clutch, said forward clutch connected in power receiving connection with a prime mover and in power delivering connection with load to be driven, said rear clutch being connected in driven engagement with said forward clutch and engageable with said load to be driven for driving the latter in a reverse direction, said forward and rear clutches each including clutch plates, a power transmitting shaft extending axially and centrally therethrough, said clutches including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable for said docking, the other larger of said piston areas being adapted to have fluid flow directed thereto to effect maximum and unmodulatable engagement of said clutch for driving said propeller;

and for each of said forward and rear clutches, a trigger valve for controlling fluid flow to said other larger of said piston areas in response to fluid pressure above a certain valve at said one smaller of said piston areas, a pressure fluid passage in said shaft for conducting pressure fluid to said smaller area and to said larger piston area, said trigger valve being located in said shaft passage and being spring loaded to a normally closed position in which pressure fluid is directed to said one smaller piston area at a variable fluid pressure whereby said clutch is modulatable, said trigger valve when closed acting to block flow of fluid to said larger area below a predetermined pressure, and when said trigger valve is open acting to permit fluid flow above a predetermined pressure to said larger area of said piston to effect maximum and unmodulatable engagement of said clutch for full clutch capacity, and an electronic control circuit for said transmission including a source of pressure fluid, a proportional valve connected to said source for delivering pressure fluid to said rear clutch, said source connected to another proportional valve for delivering pressure fluid to said forward clutch, said circuit also including a control lever operatively connected with said proportional valves for selective operation thereof to effect forward or reverse operation of said boat.

* * * * *